(12) United States Patent
Iwata (10) Patent No.: US 10,533,660 B2
(45) Date of Patent: Jan. 14, 2020

(54) HYDRAULIC CONTROL DEVICE AND HYDRAULIC CONTROL METHOD OF TRANSMISSION

(71) Applicant: HONDA MOTOR CO., LTD., Minato-ku, Tokyo (JP)

(72) Inventor: Masayoshi Iwata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 15/963,186

(22) Filed: Apr. 26, 2018

(65) Prior Publication Data
US 2018/0313446 A1 Nov. 1, 2018

(30) Foreign Application Priority Data
May 1, 2017 (JP) .................................. 2017-091095

(51) Int. Cl.
*F16H 61/66* (2006.01)
*F16H 59/36* (2006.01)
*F16H 61/02* (2006.01)
*F16H 59/72* (2006.01)
*F16H 61/00* (2006.01)

(52) U.S. Cl.
CPC ............. *F16H 61/66* (2013.01); *F16H 59/36* (2013.01); *F16H 59/72* (2013.01); *F16H 61/0021* (2013.01); *F16H 61/0213* (2013.01); *F16H 2059/366* (2013.01); *F16H 2061/6604* (2013.01)

(58) Field of Classification Search
None
See application file for complete search history.

(56) References Cited

U.S. PATENT DOCUMENTS

| 5,063,815 A * | 11/1991 | Oshidari ............. F16H 37/0846 477/38 |
| 6,881,170 B2 * | 4/2005 | Onoyama ........... F02D 41/0215 477/37 |
| 7,104,907 B2 | 9/2006 | Jozaki et al. |
| 8,157,681 B2 * | 4/2012 | Iwasa ................ F16H 61/66259 474/28 |
| 8,323,148 B2 * | 12/2012 | Ohashi ................ F16H 61/0021 477/83 |

(Continued)

FOREIGN PATENT DOCUMENTS

| JP | 2004-124959 | 4/2004 |
| JP | 2012-145117 | 8/2012 |

(Continued)

OTHER PUBLICATIONS

Japanese Office Action for Japanese Patent Application No. 2017-091095 dated Mar. 5, 2019.

*Primary Examiner* — Dirk Wright
(74) *Attorney, Agent, or Firm* — Amin, Turocy & Watson, LLP (57) ABSTRACT

In a hydraulic control device and a hydraulic control method of a transmission, in a case that an oil supplying section is supplying a first oil to a continuously variable transmission mechanism, a TCU outputs, to an LC control valve of the oil supplying section, a control signal for giving a command to start supply of a second oil to a torque converter if a pulley pressure detected by a pressure sensor reaches a pressure threshold value.

4 Claims, 3 Drawing Sheets

(56) References Cited

U.S. PATENT DOCUMENTS

| | | | | |
|---|---|---|---|---|
| 8,652,002 B2* | 2/2014 | Otanez | ............... | F16H 61/0031 |
| | | | | 477/54 |
| 9,080,671 B2* | 7/2015 | Suzuki | .............. | F16H 61/66259 |
| 9,383,009 B2* | 7/2016 | Lundberg | ............ | F16H 61/0031 |
| 9,441,733 B2* | 9/2016 | Takahashi | ............... | F16H 59/20 |

FOREIGN PATENT DOCUMENTS

| | | |
|---|---|---|
| JP | 2015-014362 | 1/2015 |
| JP | 2015-200369 | 11/2015 |

* cited by examiner

HYDRAULIC CONTROL DEVICE AND HYDRAULIC CONTROL METHOD OF TRANSMISSION

CROSS-REFERENCE TO RELATED APPLICATION

This application is based upon and claims the benefit of priority from Japanese Patent Application No. 2017-091095 filed on May 1, 2017, the contents of which are incorporated herein by reference.

BACKGROUND OF THE INVENTION

Field of the Invention

The present invention relates to a hydraulic control device and a hydraulic control method of a transmission, in which a first oil is supplied to a first hydraulic actuation unit and a second oil having a pressure lower than the pressure of the first oil is supplied to a second hydraulic actuation unit.

Description of the Related Art

When a vehicle is put in a stoppage state (a state in which an engine is stopped) for a long time, oil drains out of the parts in a transmission. This produces, at the start of the engine, a creep delay state in which a driving force is not transmitted to wheels of the vehicle from the engine via the transmission until filling of the parts with oil is completed.

In order to eliminate such a state, it is conceivable, for example, that after start of the engine, supply of oil into a torque converter of the transmission is started at a time point when the engine rotational speed reaches a predetermined rotational speed, and the torque converter is filled with the oil quickly. Specifically, the oil is preferentially supplied to the torque converter by energizing, for a predetermined time, a solenoid valve for a lock-up clutch that constitutes a hydraulic circuit (a hydraulic control device) of the transmission.

An example of the hydraulic control device of a transmission is disclosed in Japanese Laid-Open Patent Publication No. 2015-014362.

SUMMARY OF THE INVENTION

In a hydraulic circuit of a continuously variable transmission, for instance, a continuously variable transmission mechanism as a first hydraulic actuation unit that is actuated by supply of a high-pressure first oil is connected on an upstream side and a torque converter as a second hydraulic actuation unit that is actuated by supply of a low-pressure second oil is connected on a downstream side. Thus, supply of oil to the torque converter cannot be started unless supply of oil to a drive pulley and a driven pulley of the continuously variable transmission mechanism is completed. Therefore, even if a solenoid valve is energized during a period from start of an engine until completion of supply of oil to each pulley, oil is not supplied to the torque converter, and consequently electric power is wastefully consumed.

The present invention has been made to solve such a problem, and an object thereof is to provide a hydraulic control device and a hydraulic control method of a transmission, in which it is possible to improve the fuel economy of a vehicle by reducing unnecessary power consumption associated with supply of oil.

According to aspects of the present invention, there are provided a hydraulic control device and a hydraulic control method of a transmission, in which a first oil is supplied to a first hydraulic actuation unit and a second oil having a pressure lower than a pressure of the first oil, to a second hydraulic actuation unit.

In order to attain the above-described object, the hydraulic control device includes an oil supplying section, a pressure detecting unit, and a control unit. The oil supplying section performs at least one of supply of the first oil to the first hydraulic actuation unit and supply of the second oil to the second hydraulic actuation unit. The pressure detecting unit detects the pressure of the first oil. The control unit outputs, to the oil supplying section, a control signal for giving a command to start supply of the second oil to the second hydraulic actuation unit if the value of the pressure of the first oil detected by the pressure detecting unit reaches a predetermined pressure threshold value when the oil supplying section is supplying the first oil to the first hydraulic actuation unit.

Moreover, in order to attain the above-described object, the hydraulic control method includes first to fourth steps. In the first step, supply of the first oil from the oil supplying section to the first hydraulic actuation unit is started. In the second step, the pressure of the first oil is detected by a pressure detecting unit. In the third step, if the pressure value of the first oil detected by the pressure detecting unit reaches a predetermined pressure threshold value, a control signal for giving a command to start supply of the second oil to the second hydraulic actuation unit is output from a control unit to the oil supplying section. In the fourth step, supply of the second oil from the oil supplying section to the second hydraulic actuation unit is started based on supply of the control signal from the control unit.

As described above, in the present invention, the first oil is preferentially supplied to the first hydraulic actuation unit and, during a period from when supply of the first oil is started to when the pressure value of the first oil reaches the pressure threshold value, supply of the second oil to the second hydraulic actuation unit is not performed. Therefore, after the pressure value of the first oil has reached the pressure threshold value, supply of the second oil to the second hydraulic actuation unit is started. Thus, unnecessary power consumption associated with supply of the second oil is avoided, and it is possible to improve the fuel economy of the vehicle.

In one of the aspects, the hydraulic control device may further include a rotational speed detecting unit configured to detect the engine rotational speed of a vehicle incorporating the transmission. In a case that the pressure detecting unit is in an abnormal state, the control unit outputs the control signal to the oil supplying section if the engine rotational speed detected by the rotational speed detecting unit reaches a predetermined rotational speed threshold value. As a result, even if the pressure detecting unit is in an abnormal state such as breakdown, it is possible to operate the hydraulic control device appropriately.

Moreover, the hydraulic control device may further include a pump configured to supply oil to the oil supplying section, and the oil supplying section may include first to fourth valves. That is, the first valve is configured to be actuated depending on the pressure of the first oil and thereby perform at least one of supply of the oil supplied from the pump, to the first hydraulic actuation unit as the first oil and outputting of the oil toward the second hydraulic actuation unit. The second valve reduces the pressure of the first oil and outputs, as a third oil, the pressure-reduced first oil. The third valve is a solenoid valve and configured to be opened based on the control signal and thereby allow the third oil to flow therethrough. The fourth valve is configured to be actuated depending on the pressure of the third oil supplied from the third valve, and thereby reduce the pressure of the oil output from the first valve toward the second hydraulic actuation unit and supply the pressure-reduced oil as the second oil to the second hydraulic actuation unit.

In this case, the transmission may be a continuously variable transmission, the first hydraulic actuation unit may be a continuously variable transmission mechanism of the continuously variable transmission, and the second hydraulic actuation unit may be a torque converter.

By configuring the hydraulic control device in this manner, unnecessary energization of the solenoid valve at the start of the engine is avoided, and it is possible to achieve further improvement of the fuel economy of the vehicle.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a hydraulic control device and a hydraulic control method of a transmission according to the present invention will be described in detail with reference to the accompanying drawings.

1. Configuration of the Present Embodiment

Figure 1:
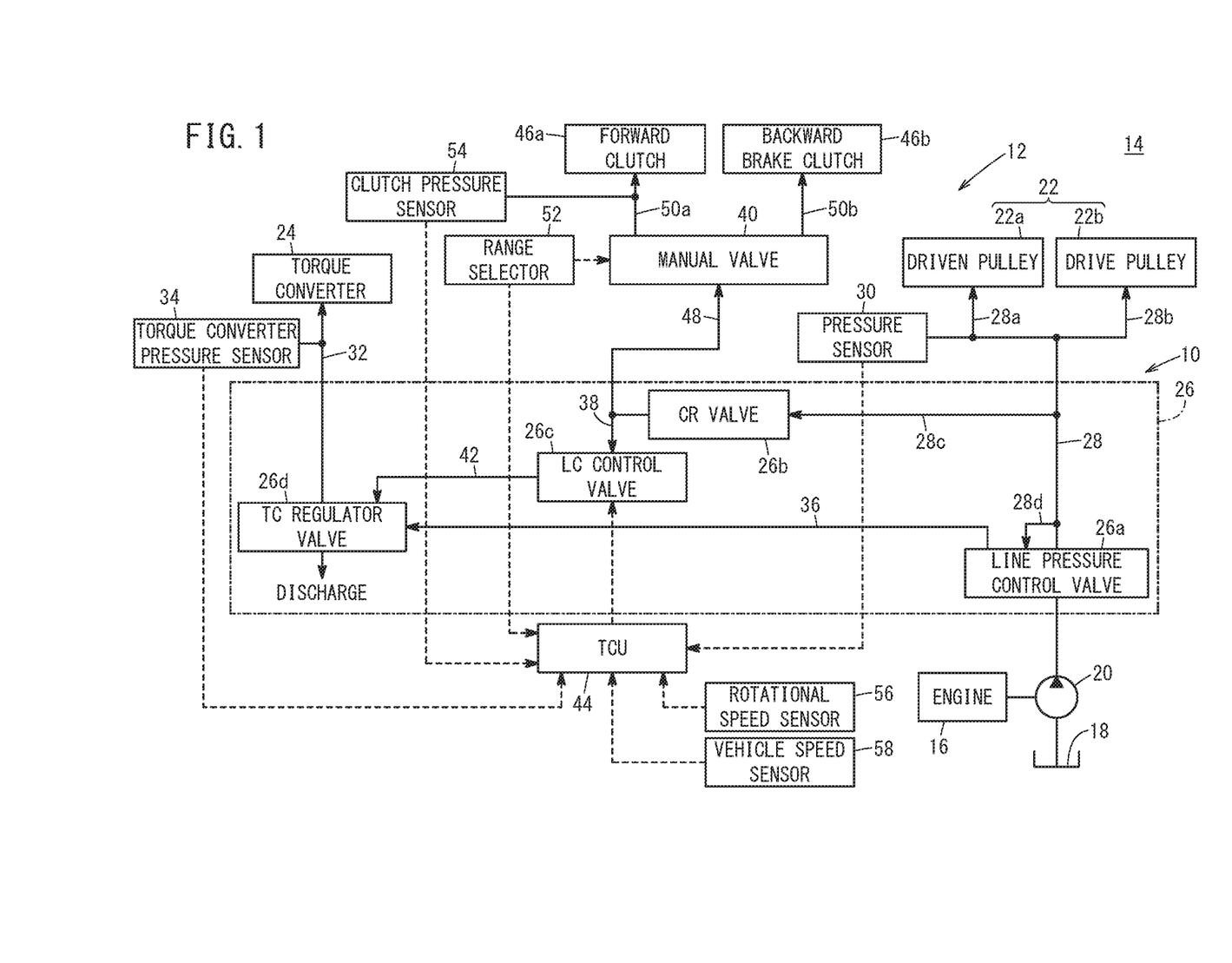
FIG. 1 is a configuration diagram of a hydraulic control device according to an embodiment of the present invention.

FIG. 1 is a configuration diagram of a hydraulic control device 10 of a transmission according to the present embodiment (hereinafter referred to as the hydraulic control device 10 according to the present embodiment). The hydraulic control device 10 is applied to, for example, a vehicle 14 incorporating a transmission 12 which is a continuously variable transmission (CVT).

The hydraulic control device 10 includes a hydraulic pump 20 serving as a gear pump which is operated by an engine 16 of the vehicle 14 and configured to pump up and pressure-feed oil (hydraulic oil) stored in a reservoir 18, and an oil supplying section 26 that is connected to the downstream side of the hydraulic pump 20 and supplies oil to at least one of a continuously variable transmission mechanism 22 as a first hydraulic actuation unit and a torque converter 24 as a second hydraulic actuation unit. Therefore, the hydraulic pump 20 is connected to the continuously variable transmission mechanism 22 and the torque converter 24 on the downstream side via the oil supplying section 26.

In this case, the continuously variable transmission mechanism 22 is connected to the downstream side of the oil supplying section 26 and the torque converter 24 is connected to the downstream side of the oil supplying section 26. Moreover, the oil supplying section 26 performs at least one of the following two operations: (1) supplying oil supplied from the hydraulic pump 20, to the continuously variable transmission mechanism 22 as a first oil; and (2) reducing the pressure of the oil and supplying the pressure-reduced oil as a second oil to the torque converter 24.

The continuously variable transmission mechanism 22 is configured to include a driven pulley 22a and a drive pulley 22b. In this case, an oil passage 28 for supplying the first oil from the oil supplying section 26 is bifurcated into an oil passage 28a which is connected to the driven pulley 22a and an oil passage 28b which is connected to the drive pulley 22b. At a location on the oil passage 28a, a pressure sensor (a pressure detecting unit) 30 that detects the pressure Pp (which is also the lateral pressure of the driven pulley 22a and hereinafter also be referred to as the pulley pressure Pp) of the first oil supplied to the driven pulley 22a is provided. The pressure sensor 30 may also be provided in the oil passage 28, as long as the pressure sensor 30 can detect the pulley pressure Pp (i.e., the pressure of the first oil depending on the pulley pressure Pp).

The second oil is supplied from the oil supplying section 26 to the torque converter 24 via an oil passage 32. At a location on the oil passage 32, a torque converter pressure sensor 34 that detects the pressure Ptc (hereinafter also referred to as the torque converter pressure Ptc) of the second oil is provided.

The oil supplying section 26 is configured to include a line pressure control valve (a first valve) 26a, a CR valve (a second valve) 26b, an LC control valve (a third valve) 26c, and a TC regulator valve (a fourth valve) 26d.

The upstream side of the line pressure control valve 26a is connected to the hydraulic pump 20, and the downstream side is connected to the continuously variable transmission mechanism 22 via the oil passage 28. In this case, in the oil supplying section 26, an oil passage 28c is branched from the oil passage 28 and connected to the CR valve 26b, and an oil passage 28d is branched also from the oil passage 28 and connected to the line pressure control valve 26a. Moreover, the line pressure control valve 26a and the TC regulator valve 26d are connected to each other via an oil passage 36.

The line pressure control valve 26a is a spool valve. As a result of an unillustrated spool being actuated in an axial direction in accordance with the pressure of the first oil flowing thereinto via the oil passages 28, 28d, the line pressure control valve 26a performs at least one of outputting of oil, which is supplied from the hydraulic pump 20, to the oil passage 28 as the first oil and outputting of the oil to the oil passage 36.

The upstream side of the CR valve 26b is connected to the oil passage 28c, and the downstream side is connected to the LC control valve 26c and a manual valve 40 via an oil passage 38. The CR valve 26b is a pressure-reducing valve, and reduces the pressure of the first oil, which is supplied from the oil passage 28c, and outputs the pressure-reduced first oil to the oil passage 38 as a third oil.

The upstream side of the LC control valve 26c is connected to the oil passage 38, and the downstream side is connected to the TC regulator valve 26d via an oil passage 42. The LC control valve 26c is a solenoid valve for an unillustrated lock-up clutch in the torque converter 24. In this case, while a control signal is being supplied from a transmission control unit (TCU) 44 (which will be described later) to energize a solenoid, the LC control valve 26c is in a valve-opened state, whereby the oil passages 38 and 42 communicate with each other, and the third oil is supplied to the TC regulator valve 26d.

The upstream side of the TC regulator valve 26d is connected to the oil passage 36, and the downstream side is connected to the torque converter 24 via the oil passage 32. The TC regulator valve 26d is a spool valve. As a result of an unillustrated spool being actuated in an axial direction in accordance with the pressure of the third oil supplied from the LC control valve 26c via the oil passage 42, the TC regulator valve 26d reduces the pressure of the oil supplied via the oil passage 36 and supplies the pressure-reduced oil as the second oil to the torque converter 24 via the oil passage 32.

In the transmission 12, the manual valve 40, a forward clutch 46a, and a backward brake clutch 46b are further provided. The upstream side of the manual valve 40 is connected to an oil passage 48 branching off from the oil passage 38, and the downstream side is connected to the forward clutch 46a via an oil passage 50a and connected to the backward brake clutch 46b via an oil passage 50b. The manual valve 40 is a spool valve. When a driver operates a range selector 52 provided near a driver's seat of the vehicle 14 to thereby select one of shift positions such as P (parking), R (reverse), N (neutral), and D (forward, drive), an unillustrated spool moves in an axial direction by a predetermined amount in accordance with the selected shift position. As a result, the manual valve 40 allows the vehicle 14 to travel in a forward direction by supplying the third oil, which is supplied from the CR valve 26b via the oil passages 38, 48, to the forward clutch 46a via the oil passage 50a, or allows the vehicle 14 to travel in a backward direction by supplying the third oil to the backward brake clutch 46b via the oil passage 50b. At a location on the oil passage 50a, a clutch pressure sensor 54 that detects the pressure Pcl (hereinafter also referred to as the clutch pressure Pcl) of the third oil, which is supplied to the oil passage 50a, is provided.

The hydraulic control device 10 further includes, in addition to the TCU 44, a rotational speed sensor (a rotational speed detecting unit) 56 and a vehicle speed sensor (a vehicle speed detecting unit) 58. The rotational speed sensor 56 detects the engine rotational speed Ne of the engine 16. The vehicle speed sensor 58 detects the vehicle speed V of the vehicle 14. The TCU 44 is a control unit of the transmission 12 and controls the transmission 12 based on the pulley pressure Pp which is sequentially detected by the pressure sensor 30, the torque converter pressure Ptc which is sequentially detected by the torque converter pressure sensor 34, a position signal indicating the current shift position which is output from the range selector 52, the clutch pressure Pcl which is sequentially detected by the clutch pressure sensor 54, the engine rotational speed Ne which is sequentially detected by the rotational speed sensor 56, and the vehicle speed V which is sequentially detected by the vehicle speed sensor 58. For instance, based on the pulley pressure Pp detected by the pressure sensor 30, the TCU 44 outputs, to the LC control valve 26c, the control signal (the control signal for giving a command to establish communication between the oil passages 38 and 42) for energizing the solenoid.

The continuously variable transmission mechanism 22, the torque converter 24, the manual valve 40, the forward clutch 46a, the backward brake clutch 46b, and so forth which constitute the transmission 12 that is a continuously variable transmission are disclosed in, for example, Japanese Laid-Open Patent Publication No. 2015-014362, and thus the detailed descriptions thereof will be omitted.

2. Operation of the Present Embodiment

An operation of the hydraulic control device 10 (a hydraulic control method) according to the present embodiment configured as described above will be described with reference to FIGS. 2 and 3. Here, a case in which the engine 16 is started in a state in which the vehicle 14 (see FIG. 1) has been in a stoppage state (a state in which the engine 16 is stopped) for a long time and oil drains out of the parts in the transmission 12 will be described as an example. The following description will be given with reference also to the configuration diagram of FIG. 1 when necessary.

Figure 2:
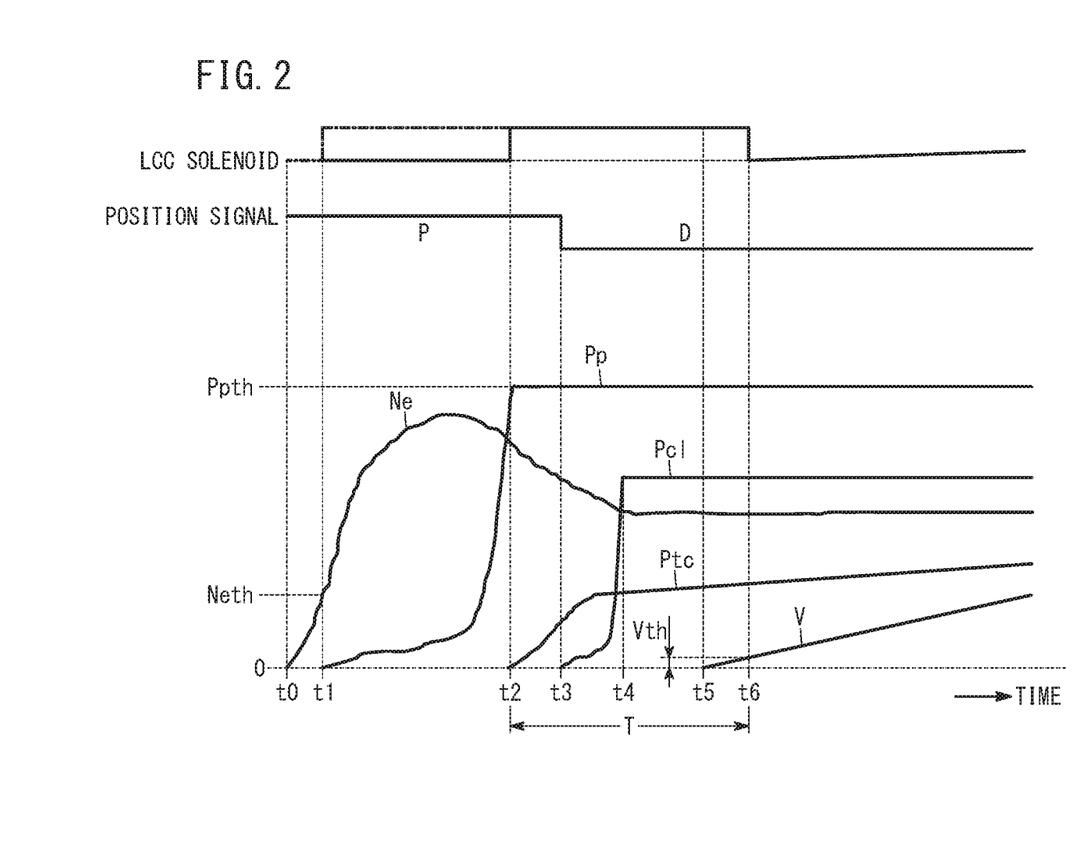
FIG. 2 is a timing chart for explaining an operation of the hydraulic control device of FIG. 1.
Figure 3:
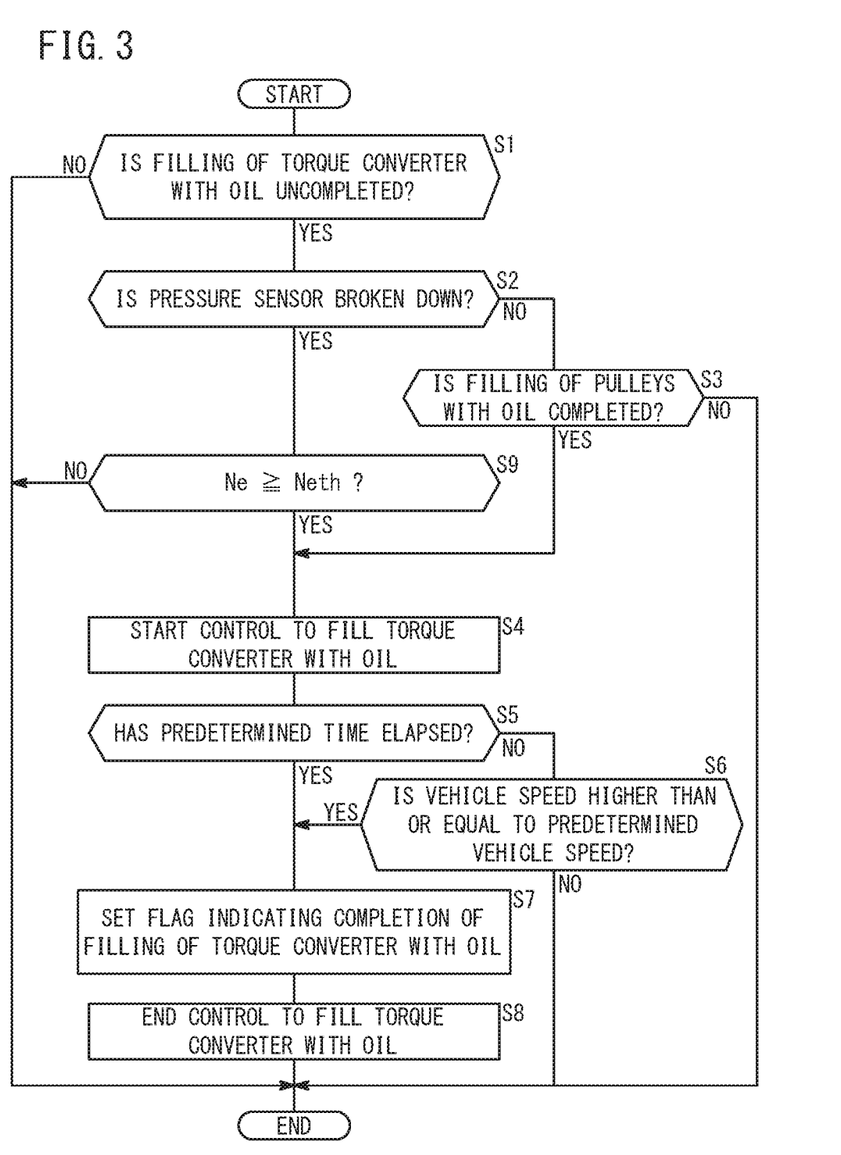
FIG. 3 is a flowchart for explaining the operation of the hydraulic control device of FIG. 1.

FIGS. 2 and 3 are a timing chart and a flowchart, respectively, which show an operation that is performed at the start of the engine 16 in the vehicle 14 to which the hydraulic control device 10 is applied. Processing of the flowchart of FIG. 3 is performed mainly by the TCU 44 and repeatedly executed at predetermined time intervals at the start of the engine 16. In the following description, the operation of the hydraulic control device 10 will be described in chronological order indicated in the timing chart of FIG. 2.

<2.1 Operation in Time Period from t0 to t1>

At a time point t0, if the shift position indicated by the position signal is P (parking), and the control signal is not supplied to the LC control valve 26c (LCC solenoid in FIG. 2) from the TCU 44, when the driver turns on an unillustrated ignition switch of the vehicle 14 and starts the engine 16, the engine rotational speed Ne increases with time. Moreover, after the time point t0, the pressure sensor 30, the torque converter pressure sensor 34, the clutch pressure sensor 54, the rotational speed sensor 56, and the vehicle speed sensor 58 each start a detecting operation and sequentially output a signal indicating the detection result to the TCU 44. Furthermore, the range selector 52 also outputs the position signal indicating the current shift position to the TCU 44.

Then, in a time period from the time point t0 to a time point t1 at which the engine rotational speed Ne reaches a predetermined rotational speed threshold value Neth (for example, Neth=500 rpm), the TCU 44 repeatedly performs the following sequence of processes at predetermined time intervals.

That is, in step S1 of FIG. 3, based on the torque converter pressure Ptc detected by the torque converter pressure sensor 34, the TCU 44 determines whether or not filling of the torque converter 24 with the second oil is uncompleted. In this case, since the torque converter pressure Ptc is approximately 0, the TCU 44 determines that filling of the torque converter 24 with the second oil is uncompleted (step S1: YES), and proceeds to a determination process in next step S2.

In step S2, based on the pulley pressure Pp detected by the pressure sensor 30, the TCU 44 determines whether or not the pressure sensor 30 is in an abnormal state (e.g., breakdown). In this case, the TCU 44 determines whether or not the pressure sensor 30 is in an abnormal state by checking whether or not the pulley pressure Pp is an abnormal value, for example, whether or not the level of the signal indicating the pulley pressure Pp is stuck at a maximum value.

Since filling of the first oil is not performed and the pulley pressure Pp is approximately 0 in the time period from t0 to t1, the TCU 44 determines that the pressure sensor 30 is normal (step S2: NO) and proceeds to a determination process in next step S3.

In step S3, based on the pulley pressure Pp, the TCU 44 determines whether or not filling of the driven pulley 22a and the drive pulley 22b with the first oil is completed. As described above, since filling with the first oil is not performed in the time period from t0 to t1, the pulley pressure Pp is approximately 0. Thus, the TCU 44 determines that filling with the first oil is not completed (step S3: NO) and ends the current sequence of processes.

<2.2 Operation in Time Period from t1 to t2>

When the engine rotational speed Ne reaches the rotational speed threshold value Neth at the time point t1 (Ne=Neth), the hydraulic pump 20 starts the pumping operation, pumps up the oil in the reservoir 18, and starts pressure-feeding of the oil to the oil supplying section 26. Then, the line pressure control valve 26a of the oil supplying section 26 supplies the pressure-fed oil as the first oil to the driven pulley 22a and the drive pulley 22b via the oil passages 28, 28a, and 28b (a first step). As a result, supply of the first oil to the driven pulley 22a and the drive pulley 22b is started, and the pulley pressure Pp increases with time (a second step).

The first oil is supplied to the CR valve 26b via the oil passages 28, 28c. The CR valve 26b reduces the pressure of the supplied first oil, and supplies, as the third oil, the pressure-reduced first oil to the LC control valve 26c via the oil passage 38 and to the manual valve 40 via the oil passage 48.

In a time period from t1 to t2, the control signal is not supplied to the LC control valve 26c. Thus, the LC control valve 26c is in a valve-closed state. Moreover, since the spool is in a position corresponding to the shift position of P (parking), the manual valve 40 does not supply the third oil supplied through the oil passage 48, to the forward clutch 46a or to the backward brake clutch 46b.

Furthermore, the first oil is also supplied to the line pressure control valve 26a via the oil passages 28, 28d. In this case, when the pressure of the first oil exceeds a predetermined pressure, the spool of the line pressure control valve 26a is displaced in the axial direction, and supply of the oil to the TC regulator valve 26d is started via the oil passage 36. However, in the time period from t1 to t2, since the third oil is not supplied to the TC regulator valve 26d from the LC control valve 26c, even when the TC regulator valve 26d is supplied with the oil via the oil passage 36, the TC regulator valve 26d cannot perform supply of the second oil to the torque converter 24.

Also in the time period from t1 to t2, as in the case of the time period from t0 to t1, the TCU 44 repeatedly performs the following sequence of processes at predetermined time intervals.

Specifically, after making the determinations: "step S1: YES"→"step S2: NO", the TCU 44 determines in step S3 whether or not the pulley pressure Pp has reached a pressure threshold value Ppth. The pressure threshold value Ppth is a pulley pressure Pp at which filling of the driven pulley 22a and the drive pulley 22b with the first oil is completed. That is, the TCU 44 determines in step S3 whether or not filling of the driven pulley 22a and the drive pulley 22b with the first oil is completed. Since the pulley pressure Pp does not reach the pressure threshold value Ppth in the time period from t1 to t2, the TCU 44 determines that filling with the first oil is not completed (step S3: NO), and ends this sequence of processes.

<2.3 Operation in Time Period from t2 to t3>

If the pulley pressure Pp reaches the pressure threshold value Ppth at the time point t2 (Pp=Ppth), after making the determinations: "step S1: YES"→"step S2: NO", the TCU 44 makes an affirmative judgment in step S3 (step S3: YES), and proceeds to the process in next step S4.

In step S4 (a third step, a fourth step), since filling of the driven pulley 22a and the drive pulley 22b with the first oil has been completed, the TCU 44 makes a decision to start supply of the second oil to the torque converter 24, and starts supply of the control signal to the LC control valve 26c. In the LC control valve 26c, since energization of the solenoid is started based on the supply of the control signal, the LC control valve 26c is switched from the valve-closed state to the valve-opened state, and then the oil passage 38 and the oil passage 42 communicate with each other. As a result, the third oil is supplied to the TC regulator valve 26d from the LC control valve 26c via the oil passage 42.

In the TC regulator valve 26d, the spool is displaced in the axial direction in accordance with the pressure of the supplied third oil, and reduces the pressure of the oil which is supplied via the oil passage 36. Then, the TC regulator valve 26d starts supply of the pressure-reduced oil as the second oil to the torque converter 24 via the oil passage 32. As described above, since supply of the second oil to the torque converter 24 is started, the torque converter pressure Ptc increases with time after the time point t2.

In next step S5, the TCU 44 determines whether or not a predetermined time T has elapsed after the time point t2. The predetermined time T is, for example, a time required to complete filling of the torque converter 24 with the second oil. If the predetermined time T has not elapsed from the time point t2 (step S5: NO), the TCU 44 determines in next step S6 whether or not the vehicle speed V has reached a vehicle speed threshold value Vth. In this case, since the shift position is P (parking) and the vehicle speed V is approximately 0, the TCU 44 determines that the vehicle speed V has not reached the vehicle speed threshold value Vth (step S6: NO), and ends this sequence of processes. The vehicle speed threshold value Vth is, for example, a value of the vehicle speed V from which it can be determined that the torque converter 24 is filled with the second oil.

<2.4 Operation in Time Period from t3 to t4>

Next, at a time point t3, when the driver operates the range selector 52 to change the shift position from P (parking) to D (forward), the position signal indicating D is supplied to the TCU 44 from the range selector 52 and the spool of the manual valve 40 is displaced to a position corresponding to D. As a result, supply of the third oil to the forward clutch 46a from the manual valve 40 via the oil passage 50a is started, and the clutch pressure Pcl increases with time. Then, the clutch pressure Pcl reaches a predetermined pressure at a time point t4, and filling of the forward clutch 46a with the third oil is completed. As a result, the vehicle 14 is placed in a state in which the vehicle 14 can travel forward. In a time period from t3 to t4, as in the case of the time period from t2 to t3, the TCU 44 repeatedly executes a sequence of processes at predetermined time intervals in the order of: "step S1: YES"→"step S2: NO"→"step S3: YES"→"step S4"→"step S5: NO"→"step S6: NO".

<2.5 Operation in Time Period from t4 to t5>

A time period from t4 to t5 is a state in which, although filling of the forward clutch 46a with the third oil is completed, filling of the torque converter 24 with the second oil is not completed (i.e., a state in which the torque converter pressure Ptc is low). Thus, in this time period, since the driving force of the engine 16 is not transmitted to the wheels of the vehicle 14 via the transmission 12 and the like, the vehicle speed V is approximately 0 (the vehicle 14 does not travel forward). Also in this time period, the TCU 44 repeatedly executes a sequence of processes similar to the sequence of processes in the time period from t3 to t4 at predetermined time intervals.

<2.6 Operation in Time Period from t5 to t6>

At a time point t5, when the torque converter pressure Ptc increases to a relatively high pressure, the driving force of the engine 16 is transmitted to the wheels via the torque converter 24 and the like, and the vehicle 14 starts traveling forward. As a result, the vehicle speed V increases with time. Also in this time period, the TCU 44 repeatedly executes a sequence of processes similar to the sequence of processes in the time period from t2 to t3 and the time period from t3 to t4 at predetermined time intervals.

<2.7 Operation in Time Period after t6>

At a time point t6 after a lapse of a predetermined time T from the time point t2, the TCU 44 executes the following sequence of processes: "step S1: YES"→"step S2: NO"→"step S3: YES"→"step S4", and thereafter makes an affirmative judgment in step S5 (step S5: YES). Then, control proceeds to next step S7. In step S7, the TCU 44 sets a flag to the effect that filling of the torque converter 24 with the second oil has been completed, and control proceeds to next step S8.

In step S8, in accordance with the set flag, the TCU 44 stops supply of the control signal to the LC control valve 26c in order to stop supply of the second oil to the torque converter 24. In response thereto, energization of the solenoid of the LC control valve 26c is stopped, whereby the LC control valve 26c is switched from the valve-opened state to the valve-closed state. As a result, communication between the oil passage 38 and the oil passage 42 is interrupted, and the supply of the third oil to the TC regulator valve 26d is stopped.

In the TC regulator valve 26d, as a result of supply stop of the third oil, the spool is returned to the original position. Thus, the operation to reduce the pressure of the oil which is supplied via the oil passage 36 is stopped, and the supply of the second oil to the torque converter 24 via the oil passage 32 is stopped. As a result, control to fill the torque converter 24 with the second oil is completed. Then, after the time point t6, the vehicle 14 travels forward and the vehicle speed V increases with time.

In the present embodiment, control to perform filling with the second oil may be completed based on the vehicle speed V. In this case, after "step S4", a negative judgment is made in step S5 (step S5: NO), and control proceeds to next step S6. In step S6, since the vehicle speed V has reached the vehicle speed threshold value Vth, the TCU 44 makes an affirmative judgment (step S6: YES) and then sequentially performs the processes in steps S7 and S8.

<2.8 Operation Performed when the Pressure Sensor 30 is in Abnormal State>

The above description of the operation has been given concerning a case in which the pressure sensor 30 is in a normal state (step S2: NO). On the other hand, if a determination is made in step S2 that the pressure sensor 30 is in an abnormal state (step S2: YES), the following sequence of processes are performed. That is, a description of an operation will be given below concerning a case in which control to perform filling with the second oil based on the pulley pressure Pp cannot be executed.

After making an affirmative judgment in step S2 (step S2: YES), the TCU 44 proceeds to next step S9. In step S9, the TCU 44 determines whether or not the engine rotational speed Ne detected by the rotational speed sensor 56 has reached the rotational speed threshold value Neth.

If the engine rotational speed Ne has not reached the rotational speed threshold value Neth (step S9: NO), the TCU 44 does not execute the processes of step S4 and the subsequent steps, and ends this sequence of processes. Therefore, in the time period from t0 to t1, supply of the second oil to the torque converter 24 is not performed.

On the other hand, if the engine rotational speed Ne reaches the rotational speed threshold value Neth at the time point t1 (step S9: YES), the TCU 44 executes the processes of step S4 and the subsequent steps. Therefore, if the pressure sensor 30 is in an abnormal state, as indicated by a dot-and-dash line in FIG. 2, supply of the control signal to the LC control valve 26c is started from the time point t1, and supply of the second oil to the torque converter 24 is started.

3. Effects of the Present Embodiment

As described above, with the hydraulic control device 10 and the hydraulic control method according to the present embodiment, supply of the first oil to the continuously variable transmission mechanism 22 is preferentially performed, and in the time period (between t1 and t2) from when supply of the first oil is started until when the pulley pressure Pp reaches the pressure threshold value Ppth, supply of the second oil to the torque converter 24 is not performed. After the pulley pressure Pp has reached the pressure threshold value Ppth (after the time point t2), supply of the second oil to the torque converter 24 is started. As a result, unnecessary power consumption associated with supply of the second oil is avoided, and thus it is possible to improve the fuel economy of the vehicle 14.

Moreover, if the pressure sensor 30 is in an abnormal state, the TCU 44 outputs the control signal to the oil supplying section 26 (that is, the LC control valve 26c thereof) when the engine rotational speed Ne detected by the rotational speed sensor 56 reaches the rotational speed threshold value Neth. With this configuration, even when the pressure sensor 30 is in an abnormal state such as breakdown, it is possible to appropriately operate the hydraulic control device 10.

In this way, since when to supply the control signal to the LC control valve 26c can be changed in accordance with the state of the pressure sensor 30, it is possible to operate the hydraulic control device 10 effectively.

Furthermore, since the transmission 12 is a continuously variable transmission provided including the continuously variable transmission mechanism 22 and the torque converter 24, by configuring the oil supplying section 26 of the hydraulic control device 10 so as to include the line pressure control valve 26a, the CR valve 26b, the LC control valve 26c, and the TC regulator valve 26d, unnecessary energization to the LC control valve 26c at the start of the engine 16 is avoided, and thus it is possible to achieve further improvement of the fuel economy of the vehicle 14.

4. Modifications of the Present Embodiment

The above description has been given concerning a case in which the first oil is supplied to the continuously variable transmission mechanism 22 from the oil supplying section 26, while the second oil is supplied to the torque converter 24 from the oil supplying section 26. However, the present embodiment is not limited to the above description, and may also be applied to a case in which the first oil is supplied to one hydraulic actuation unit (a constituent element that is actuated with high oil pressure) in the transmission 12, while the second oil is supplied to the other hydraulic actuation unit (a constituent element that is actuated with low oil pressure).

Moreover, in the present embodiment, as long as the high-pressure first oil can be supplied to the continuously variable transmission mechanism 22 and the low-pressure second oil can be supplied to the torque converter 24, the oil supplying section 26 may have any configuration. For example, another pump (an electric pump or the like which is operated by a motor) may be provided at a location on the oil passage 28 in order to increase the pressure of oil which is supplied from the hydraulic pump 20 and supply the pressure-increased oil as the first oil to the continuously variable transmission mechanism 22. In this case, the oil which is supplied from the hydraulic pump 20 may be supplied as the second oil to the torque converter 24.

It goes without saying that the present invention is not limited to the above-described embodiment and can adopt various configurations based on the descriptions of this specification.

What is claimed is:

1. A hydraulic control device of a transmission, the hydraulic control device configured to supply a first oil to a first hydraulic actuation unit and supply a second oil having a pressure lower than a pressure of the first oil, to a second hydraulic actuation unit, the hydraulic control device comprising:
   an oil supplying section configured to perform at least one of supply of the first oil to the first hydraulic actuation unit and supply of the second oil to the second hydraulic actuation unit;
   a pressure detecting unit configured to detect a pressure of the first oil; and
   a control unit configured to output, to the oil supplying section, a control signal for giving a command to start supply of the second oil to the second hydraulic actuation unit if a value of the pressure of the first oil detected by the pressure detecting unit reaches a predetermined pressure threshold value when the oil supplying section is supplying the first oil to the first hydraulic actuation unit.

2. The hydraulic control device of the transmission according to claim 1, further comprising:
   a rotational speed detecting unit configured to detect an engine rotational speed of a vehicle incorporating the transmission, wherein
   in a case that the pressure detecting unit is in an abnormal state, the control unit outputs the control signal to the oil supplying section if the engine rotational speed detected by the rotational speed detecting unit reaches a predetermined rotational speed threshold value.

3. The hydraulic control device of the transmission according to claim 1, further comprising a pump configured to supply oil to the oil supplying section, wherein the oil supplying section includes:
   a first valve configured to be actuated depending on the pressure of the first oil and thereby perform at least one of supply of the oil supplied from the pump, to the first hydraulic actuation unit as the first oil and outputting of the oil toward the second hydraulic actuation unit;
   a second valve configured to reduce a pressure of the first oil and outputs, as a third oil, the pressure-reduced first oil;
   a third valve configured as a solenoid valve configured to be opened based on the control signal and thereby allow the third oil to flow therethrough; and
   a fourth valve configured to be actuated depending on a pressure of the third oil supplied from the third valve, and thereby reduce a pressure of the oil output from the first valve toward the second hydraulic actuation unit and supply the pressure-reduced oil as the second oil to the second hydraulic actuation unit,
   the transmission is a continuously variable transmission,
   the first hydraulic actuation unit is a continuously variable transmission mechanism of the continuously variable transmission, and
   the second hydraulic actuation unit is a torque converter.

4. A hydraulic control method of a transmission, the hydraulic control method for supplying a first oil to a first hydraulic actuation unit and supplying a second oil having a pressure lower than a pressure of the first oil, to a second hydraulic actuation unit, the hydraulic control method comprising:
   a first step of starting supply of the first oil from an oil supplying section to the first hydraulic actuation unit;
   a second step of detecting a pressure of the first oil by a pressure detecting unit;
   a third step of outputting, from a control unit to the oil supplying section, a control signal for giving a command to start supply of the second oil to the second hydraulic actuation unit if a value of the pressure of the first oil detected by the pressure detecting unit reaches a predetermined pressure threshold value; and
   a fourth step of starting supply of the second oil from the oil supplying section to the second hydraulic actuation unit based on supply of the control signal from the control unit.

* * * * *